United States Patent [19]
Yamaguchi et al.

[11] 3,989,881
[45] Nov. 2, 1976

[54] CATALYST AND PROCESS FOR POLYMERIZATION OF OLEFIN

[75] Inventors: Kazuo Yamaguchi, Fujisawa; Natsuki Kanoh, Sagamihara; Toru Tanaka, Komae; Nobuo Enokido, Yokohama; Atsushi Murakami, Machida; Seiji Yoshida, Yokohama, all of Japan

[73] Assignee: Mitsubishi Chemical Industries Ltd., Tokyo, Japan

[22] Filed: Apr. 4, 1975

[21] Appl. No.: 565,196

[30] Foreign Application Priority Data
Apr. 8, 1974 Japan.............................. 49-39736
Apr. 8, 1974 Japan.............................. 49-39737
June 4, 1974 Japan.............................. 49-63087

[52] U.S. Cl. ........................ 526/125; 252/429 B; 252/429 C; 526/348; 526/352
[51] Int. Cl.² ..................... C08F 4/02; C08F 10/02
[58] Field of Search ........ 252/429 R, 429 B, 429 C; 260/88.2, 93.7, 94.9 C, 94.9 DA, 94.9 E; 526/125

[56] References Cited
UNITED STATES PATENTS
3,642,746  2/1972  Kashiwa et al............. 260/94.9 DA

FOREIGN PATENTS OR APPLICATIONS
2,029,992  12/1970  Germany

*Primary Examiner*—Edward J. Smith
*Attorney, Agent, or Firm*—Oblon, Fisher, Spivak, McClelland & Maier

[57] ABSTRACT

A solid catalytic complex for the polymerization of an olefin has the formula:

$$[MgM_{1-n}]X_m \cdot xY$$

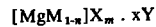

wherein M represents a transition metal selected from the group consisting of titanium and vanadium; X represents a halogen atom; Y represents an aliphatic ether or a cyclic ether; $n$ is $0.01 - 0.99$; $2 < m < 4$; and $1 < x < 3$.

19 Claims, No Drawings

CATALYST AND PROCESS FOR POLYMERIZATION OF OLEFIN

BACKGROUND OF THE INVENTION

1. Field of the Invention

The present invention relates to a catalyst useful for the polymerization of olefins, the preparation thereof, and to a process for polymerizing olefins using said catalyst.

2. Description of Prior Art

Heretofore, it has been well-known that Ziegler catalysts, which are combinations of transition metal compounds of Groups IVa–VIa of the Periodic Table, and organo-metallic compounds of Groups IA-III of the Periodic Table, are quite useful for the polymerizaton of olefins, such as ethylene. However, conventional catalysts do not possess satisfactorily high catalytic activity and are not entirely industrially acceptable. Moreover, it has been difficult to use the resulting polymers without removal of catalytic residue following polymerization.

When polyethylene is prepared by slurry polymerization, at temperatures of below that at which the polymer dissolves in a hydrocarbon, such as 90° C, to obtain the polymer in the form of a powder, the bulk density of the resulting polyethylene powder will affect the productivity of the polyethylene. The known catalysts do not produce satisfactory results.

It has also been known to prepare a Ziegler catalyst having high catalytic activity by supporting a transition metal compound on a solid support containing a Group II element of the Periodic Table, especially Mg. Catalysts comprising a chloride of a transition metal, such as titanium supported on a carrier of magnesium chloride, or a compound derived from magnesium chloride which bear close relationship to the present invention, have been disclosed in Japanese Patent Publication No. 12105/1964 (U.S. Pat. No. 3,238,146); Japanese Patent Publication No. 34092/1971 (U.S. Pat. No. 3,642,746); Japanese Patent Publication No. 41670/1972 (Great Britain Pat. No. 1,286,867); and Japanese Patent Publication No. 46269/1972 (Great Britain Pat. No. 1,292,853). In these catalysts, transition metal compounds have been effectively utilized so that the catalytic activity of the transition metal per se has been quite improved. However, even with a carrier, the catalytic activity of conventional catalysts of this type has not been completely satisfactory.

Moreover, when the olefin being polymerized is ethylene, the distribution of the molecular weight of the resulting polyethylene is not satisfactorily narrow.

In the processes disclosed in the prior art, transition metal compounds, in vapor, liquid or solid form, are contacted with solid carriers, which have desirable characteristic features, e.g., appropriate physical properties or formulation properties. Accordingly, the dispersibility of the transition metal compound has been limited because the solid is used as one component. On the other hand, it has been known that liquid magnesium compounds can be used as reducing agents and liquid transition metal compounds contacted therewith. For example, in Japanese Patent Publication No. 40959/1972, a process is disclosed providing a solid catalyst prepared by reducing a transition metal compound having normal or maximum valency, such as $TiCl_4$, with $RMg(OR')$ (R and R' represent hydrocarbon residues). The catalytic activity of the resulting catalyst is relatively higher than those of the transition metal compounds having lower valency prepared by reduction with a conventional organo-aluminum compound. However, it is still not sufficient to attain the desired purpose.

As stated above, Ziegler-Natta type catalysts having a metal compound of Group II (mainly Mg) as one component are classified into (1) catalysts prepared by contacting a solid magnesium compound with a transition metal compound, and (2) catalysts prepared by contacting a liquid magnesium compound reducing agent with a transition metal compound. However, the objects of this invention have not been attained by using either of these catalysts. The reason may be as follows: In the former, the transition metal compound is not uniformly dispersed into the solid magnesium compound carrier. In the latter, the amount of the magnesium compound combined with the solid transition metal compound having lower valency is stoichiometrically limited. That is, it is impossible to prepare a solid containing sufficient magnesium, which can be uniformly dispersed throughout the transition metal compound. From the above-mentioned viewpoints, the present invention have proposed in the past, that solid catalysts having the formula $(Ti_m \cdot V_{1-m}) X_3 \cdot nY$ ($m < 1$; X: a halogen; Y: ether) prepared by precipitating a reaction product from an ether solution of two transition metal complexes $TiX_3 \cdot n'Y$ and $VX_{3'} \cdot n''Y$, are effective as catalysts for the polymerization of an olefin (Japanese Patent Application No. 82842/1973). However, it would be most desirable to have additional catalysts with superior effectiveness for polymerization of olefins which are free from the above-described disadvantages.

SUMMARY OF THE INVENTION

Accordingly, it is one object of this invention to provide a catalyst which can be used for olefin polymerization which is characterized by high catalytic activity and which does not have to be extracted from the product following polymerization.

It is another object of the present invention to provide a catalyst which is suitable for preparing polyethylene wherein the polymer product is characterized by a narrow distribution of molecular weight, such as, a ratio less than 3, of weight average molecular weight ($M_W$) to number average molecular weight ($M_N$), ($M_W/M_N$), without the above-mentioned disadvantages.

It is another object of the invention to provide a process for preparing said catalyst.

It is still another object of this invention to provide a catalyst having high catalytic activity for preparing in high yield polyolefins having a narrow distribution of molecular weight and high bulk density.

These and other objects of this invention, as will hereinafter be made clear by the discussion below, have been attained by providing a solid catalytic complex of magnesium and a special metal halide for the polymerization of an olefin, which has the formula

wherein M represents a transition metal selected from titanium and vanadium; X represents a halogen; Y represents an aliphatic ether or cyclic ether; n represents 0.01–0.99; $2 < m < 4$; and $1 < x < 3$.

The invention also provides a process for preparing said solid catalytic complex by co-precipitating the reaction product from an ether solution of (1) an ether complex of a halide of a transition metal selected from titanium and vanadium and (2) an ether complex of magnesium halide.

The invention further provides a process for polymerization of an olefin by using said catalyst.

DESCRIPTION OF THE PREFERRED EMBODIMENTS

The solid complex having the formula $$[Mg_nM_{1-n}]X_m \cdot xY$$

is prepared by the combination of an ether complex of magnesium halide having the formula $$MgX_2 \cdot pY$$

where $1 \leq p \leq 2$; Y represents an aliphatic ether or a cyclic ether and X represents a halogen, with an ether complex of a transition metal (M) halide having the formula $$MX_a \cdot bY$$

where $3 \leq a \leq 4$; $1 \leq b \leq 3$; and Y and X are as defined above. The product is not a simple mixture but is a complex. Suitable transition metal halides include titanium trihalides, titanium tetrahalides, vanadium trihalides and vanadium tetrahalides. The ether complex of titanium trihalides has the formula $$TiX_3 \cdot qY$$

where X represents a halogen; Y represents an aliphatic ether or a cyclic ether and $q$ is 2 or 3. The ether complex of titanium tetrahalides has the formula $$TiX_4 \cdot rY$$

where X represents a halogen; Y represents an aliphatic ether or a cyclic ether and $r$ is 2. The ether complex of vanadium halide has the formula $$VX_s \cdot tY$$

where X represents a halogen; Y repreents an aliphatic ether or a cyclic ether; $3 \leq s \leq 4$; and $1 \leq t \leq 3$. The preparations of ether complexes of transition metal halides are disclosed in detail, for example, in A. *Journal of Inorganic and Nuclear Chemistry*, Pergamon Press, Ltd., Vol. 24, 1105–1109 (1962) (England);

B. *Die Naturwissenschaften* Jahrgang 46, 171 (1959) (W. Germany).

In these references, there are disclosures that an ether solution of the complex is prepared by dissolving or extracting, under reflux, titanium trihalide, titanium tetrahalide or vanadium trihalide with an excess of ether. The complex crystals are precipitated by cooling, concentrating of adding certain reagents such as a hydrocarbon.

The preparation of the ether complexes of transition metal halides for this invention are not disclosed in these references. However, the complexes of transition metal halides having the formula $$MX_a \cdot bY$$

can be prepared by an analogous process. The purity of the complex can be increased by repeated recrystallization. It is possible to attain a slurry polymerization of ethylene by using this ether complex of a transition metal halide alone. For example, it is possible to attain a slurry polymerization by using an ether complex of vanadium trihalide. In the resultant polymerization process, disadvantageous phenomena such as undue increase in required stirring torque or difficulty in controlling the polymerization temperature are not found. The resulting polymer is a powdery product having high bulk density. However, as is clear from the comparative examples shown later, the catalytic activity is not sufficiently high. The catalytic activity is also insufficiently high when the ether complex of the titanium halide is used. In addition, the disadvantageous phenomena referred to above do occur in the polymerization process (see Comparative Example 2).

The ether complexes of magnesium halide are ether soluble complexes having the formula $$MgX_2 \cdot pY \quad (1 \leq p \leq 2).$$

In Reference (A), the preparations and physical properties of ether complexes of divalent metal halides, such as $ZnCl_2 \cdot 2THF$; $NiCl_2 \cdot 2THF$, $MnCl_2 \cdot 1.5\ THF$ and $FeCl_2 \cdot 1.5\ THF$ are disclosed (hereinafter, tetrahydrofuran is referred to as THF). No disclosure of $MgX_2 \cdot pY$ is found. However, it can be prepared in the same manner as shown in the reference.

Suitable ethers for use as the complex forming agent and as the solvent in the invention include aliphatic ethers, such as diethyl ether, diisopropyl ether, dibutyl ether, dipentyl ether and ethyl . n-butyl ether; and cyclic ethers, such as tetrahydrofuran and dioxane. When an ether having a long alkyl chain, such as dipentyl ether, is used, the complex forming property is inferior and the solubility of the hydrocarbon used as the dispersing agent in the polymerization is not negligible. When an ether having a low boiling point, such as diethyl ether, is used, it is necessary to use a coolant in the preparation of the complex, which is disadvantageous industrially. Accordingly, it is preferable to use tetrahydrofuran, dioxane or diisopropyl ether, and it is most preferred to use tetrahydrofuran (THF). The ether complexes of the transition metal halides are soluble in said ethers as are the ether complexes of the magnesium halides.

The solid ether complexes having the formula $$[Mg_n\ M_{1-n}]\ X_m \cdot xY$$

wherein X is a halogen, particularly Cl or Br; Y is an aliphatic ether, particularly a dialkyl ether, wherein each alkyl group contains 1 – 10 carbon atoms, or a cyclic ether; $n$ is 0.01 – 0.99, $m$ is greater than 2 and less than 4, $x$ is greater than 1 and less than 3; when M is tetravalent Ti of V, $2<m<4$; and when M is trivalent Ti or V, $2<m<3$, are prepared by a co-precipitation from a mixture of said ether complex solutions uniformly containing the transition metal and magnesium, and are highly effective as catalysts for the polymerization of olefins. The preparation of the catalyst of this invention is not critical. An ether solution of the ether complex of a transition metal halide is mixed with an ether solution of the ether complex of the magnesium halide to coprecipitate the product. It is possible to obtain the catalyst by cooling the solution or by adding a poor solvent, such as a hydrocarbon, or by stripping off the ether. In every instance, it is preferable to remove excess ether. The use of tetravalent titanium as the transition metal is quite advantageous. When an ether solution of the ether complex of titanium tetrahalide is admixed with an ether solution of the ether complex of magnesium halide, especially when both are saturated solutions, precipitation occurs promptly. No reducing reaction occurs during admixing, and the formation of a precipitate due to common ion effects is avoided. Accordingly, formation of other complexes having poor solubility, by contacting both of the complexes, is possible.

The catalyst of this invention can be prepared by other methods, for example, by milling the mixture of an ether complex of the transition metal halide and an ether complex of magnesium halide, in a ball mill. However, it is preferable to prepare the complex by the method of coprecipitation from said ether solution, because of the ease of operation.

The solid complex having the formula $$[Mg_n \cdot M_{1-n}] X_m \cdot xY$$

prepared by said method is combined with an organo-aluminum compound thereby yielding sufficient catalytic activity for polymerization of an olefin. Suitable organo-aluminum compounds include alkyl-haloaluminum compounds having the formula $$AlR_n X_{3-n}$$

where R represents a $C_{1-14}$ saturated hydrocarbon residue; X represents a halogen, particularly Cl and Br, and $n$ is 2 or 1.5; and alkyl aluminum compounds having the formula $$AlR_n(OR')_{3-n}$$

where R and $n$ are defined above; and R' represents a $C_{1-14}$ saturated hydrocarbon residue and can be the same as R. It is most preferred to use a trialkyl aluminum having the formula $$AlRR'R''$$

where R, R' and R'' are the same or different and respectively represent a $C_{1-14}$ saturated hydrocarbon residue. Suitable trialkylaluminum compounds include $Al(C_2H_5)_3$, $Al(n-C_4H_9)_3$, $Al(iso-C_4H_9)_3$ and $Al(n-C_8H_{17})_3$. The amount of the organo-aluminum compound is usually 0.5 – 100 moles, especially 2 – 50 moles, per 1 mole of the transition metal in the solid catalyst.

The polymerization of an olefin, especially ethylene, using the catalyst of the invention can be the same as that used with conventional Ziegler catalysts. The polymerization reaction is usually conducted at a temperature of from room temperature to 200° C, preferably 60° – 100° C, in a suitable inert solvent, such as n-hexane or n-heptane, as a slurry polymerization whereby a powdery polymer is obtained which is characterized by a high bulk density. The polymerization pressure is not critical. However, preferably, the pressure is less than 20 Kg/cm² but high enough to give suitable high polymer yields. When ethylene is polymerized using the catalyst of this invention, control of the degree of polymerization can be attained by feeding a suitable amount of hydrogen into the polymerization zone. It is possible to prepare copolymers by copolymerizing ethylene with other α-olefins, such as propylene, butene-1, and/or hexene-1. In the case of copolymerization, the molar concentration of the other α-olefin in the gas phase is preferably lower than 5 mole %.

The catalyst of the invention has remarkably high catalytic activity and only a small amount of the catalyst is usually sufficient to attain adequate polymerization. Accordingly, the catalyst separation step following the polymerization of an olefin can be omitted, which is remarkably advantageous industrially. It is easy to obtain a yield of more than 30,000 g of the polymer per g of transition metal, 1 Kg/cm² of ethylene pressure and 1 hour of polymerization period at 90° C polymerization temperature. The molecular weight distribution of the polymer is remarkably narrow and can easily be $M_W/M_N \leq 3$. The molecular weight distribution of the polymer is especially narrow when the transition metal is titanium. The molecular weight of the polymer can be easily controlled by varying the amount of hydrogen gas, particularly when the transition metal is vanadium. The control of the molecular weight of the polymer by hydrogen gas will be illustrated in Example 4.

In polymerization of olefins using the catalyst of this invention, the resulting polymer will be characterized by a quite high bulk density. When polymerization of an olefin is conducted using the ether complex of the transition metal alone, especially the ether complex of titanium tetrahalide, the catalytic activity is not sufficiently high. A low bulk density polymer is obtained and occasionally a fibrous polymer is obtained even though the polymerization is conducted under conditions such that the polymer is not substantially dissolved, for example, using hydrocarbon at 80° C. A fibrous polymer is not desirable. As is clear from the comparative examples, the formation of a fibrous polymer is disadvantageous from the viewpoint of increasing stirring torque and because it is quite difficult to control the polymerization temperature. The catalyst of the invention is excellent in its capability to overcome these disadvantages. It also possesses the advantage of ease of preparation.

Vanadium trihalide and titanium trihalide are solids, and accordingly, in order to support the compound on a solid carrier, a method of mixing by a ball mill or a method of depositing a vaporized compound at high temperature under reduced pressure must be used. It is clear that these methods are disadvantageous for the preparation of the catalyst for the olefin polymerization industrially. On the other hand, for the preparation of the catalyst of this invention, it is unnecessary to carry out these disadvantageous methods. Rather, the simple preparative techniques previously discussed can be employed.

Having generally described the invention, a more complete understanding can be obtained by reference to certain specific Examples which are provided herein for purposes of illustration only and are not intended to be limiting in any manner unless otherwise specified. The molecular weight of the polymers in the examples is a viscosity average molecular weight (Mv) calculated by the equation $$[\eta] = 4.60 \times 10^{-4} \cdot Mv^{0.725}$$

wherein [η] represents intrinsic viscosity measured at 130° C in tetrahydronaphthalene. The melt index MI is measured by the method of ASTM D-1238T at 190° C. The molecular weight distribution ($M_W/M_N$) is measured by a column fraction method.

(Reference 1)

Preparation of $MgCl_2 \cdot 1.5\ THF$

In a Soxhlet extractor, 10 g of commercial anhydrous $MgCl_2$ was extracted, under reflux, with 250 ml of dry and oxygen-free dehydrated and deoxidized tetrahydrofuran (THF) in an argon gas atmosphere. After about 20 hours, solid $MgCl_2$ substantially disappeared. The extract solution was concentrated to about 100 ml, and was cooled to room temperature. It was dried in a dry nitrogen gas flow until it reached a constant weight. The elemental analysis of the product was as follows:

|  | $MgCl_2 \cdot 1.5\ THF$ | | | |
| --- | --- | --- | --- | --- |
|  | Mg | Cl | C | H |
| Measured (wt. %) | 11.1 | 32.8 | 33.3 | 6.4 |
| Calculated (wt. %) | 12.0 | 34.9 | 35.4 | 5.9 |

(Reference 2)

Preparation of $TiCl_3 \cdot 3\ THF$ and $TiCl_3 \cdot 2\ THF$

In a Soxhlet extractor, 6 g of titanium trichloride (prepared by reducing titanium tetrachloride with hydrogen) was extracted, under reflux, with 300 ml of dry and oxygen-free dehydrated and deoxidized THF in an argon gas atmosphere. After about 10 hours, titanium trichloride was substantially dissolved to form a dark violet-brown THF solution. The solution was kept for 1 day while naturally cooling, to precipitate blue crystals. The crystals were washed with pure n-hexane and dried at room temperature under a flow of dry nitrogen gas to obtain a sky blue powder. The powder was recrystallized two times with THF. The elemental analysis of the product was as follows:

|  | $TiCl_3 \cdot 3\ THF$ | |
| --- | --- | --- |
|  | Ti | Cl |
| Measured (wt. %) | 13.1 | 28.6 |
| Calculated (wt. %) | 13.0 | 28.7 |

Pure n-hexane in an amount two times the volume of the THF solution was added dropwise to the THF solution (violet-brown color). The resulting precipitate was washed with n-hexane and was dried at room temperature under a flow of nitrogen gas to obtain yellowish-green powder. The elemental analysis of the product was as follows:

|  | $TiCl_3 \cdot 2\ THF$ | |
| --- | --- | --- |
|  | Ti | Cl |
| Measured (wt. %) | 15.6 | 35.0 |
| Calculated (wt. %) | 16.0 | 35.6 |

(Reference 3)

Preparation of $TiCl_4 \cdot 2\ THF$

In a four-necked flask, 300 ml of dry and oxygen-free dehydrated and deoxidized n-hexane, and 60 mmole of $TiCl_4$ were charged under an argon gas atmosphere. The flask was dipped in a water bath to keep it at 0° – 5° C, and 180 mmole of THF was added dropwise to the mixture while stirring to form a yellow precipitate. The mixture was stirred further for about 30 minutes and the resulting solid powder was washed with pure n-hexane. It was dried at room temperature under reduced pressure to obtain a yellow powder. The elemental analysis of the product was as follows:

|  | $TiCl_4 \cdot 2\ THF$ | | | |
| --- | --- | --- | --- | --- |
|  | Ti | Cl | C | H |
| Measured (wt. %) | 14.9 | 42.2 | 27.8 | 4.8 |
| Calculated (wt. %) | 14.3 | 42.3 | 28.6 | 5.4 |

(Reference 4)

Preparation of $VCl_4 \cdot 2\ THF$

In a 1 liter flask dried and purged with nitrogen gas, 300 ml of pure n-hexane was charged and 60 ml of $VCl_4$ was dissolved. Then, 180 ml of pure THF was added dropwise to the mixture at 0° – 5° C during 15 minutes, while stirring. The formation of a dark red precipitate began at the time that the pure THF was added. After adding all of the THF, the mixture was stirred further at 0° – 5° C for 30 minutes. The resulting powdery precipitate was washed with pure n-hexane and was dried at room temperature under a flow of dry nitrogen gas to obtain a dark red powder. The elemental analysis of the product was as follows:

|  | $VCl_4 \cdot 2\ THF$ | | | |
| --- | --- | --- | --- | --- |
|  | V | Cl | C | H |
| Measured (wt. %) | 14.9 | 41.4 | 28.0 | 4.9 |
| Calculated (wt. %) | 14.6 | 40.7 | 27.5 | 5.2 |

(Reference 5)

Preparation of $VCl_3 \cdot 3\ THF$

In a Soxhlet extractor, 6 g of $VCl_3$ was extracted, under reflux, with 300 ml of dry and oxygen-free dehydrated and deoxidized THF in an inert gas atmosphere. After about 10 hours, $VCl_3$ was substantially dissolved to form a dark reddish-brown THF solution. The THF solution was kept for 1 day while naturally cooling to precipitate pale red crystals. The crystals were washed with pure n-hexane and dried at room temperature under a flow of nitrogen gas to obtain a pale red powder. The elemental analysis of the product was as follows:

|  | $VCl_3 \cdot 3\ THF$ | | | |
| --- | --- | --- | --- | --- |
|  | V | Cl | C | H |
| Measured (wt. %) | 13.9 | 28.6 | 38.4 | 6.5 |
| Calculated (wt. %) | 13.6 | 28.5 | 38.6 | 6.5 |

EXAMPLE 1

In a 1 liter four-necked flask equipped with a stirrer, 4.1 g of $TiCl_3 \cdot 3$ THF prepared in Reference 2 was admixed and dissolved in 130 ml of pure THF in an argon gas atmosphere, while stirring. Then, 7.3 g of magnesium chloride complex powder prepared in Reference 1 was admixed with the solution and the mixture was stirred at 60° C for 2 hours to dissolve it. It was then cooled to room temperature. 500 ml of dry and oxygen-free dehydrated and deoxidized n-hexane was added dropwise to the resulting solution. The precipitate was separated by decantation and was washed with pure n-hexane 3 times and was dried. The elemental analysis of the resulting solid catalyst was as follows: Measured (wt. %) Ti: 5.0; Mg: 9.5; Cl: 41; and C: 30. This corresponds to $[Mg_{0.8} \cdot Ti_{0.2}]Cl_{2.2} \cdot (THF)_{1.2}$.

In a 1 liter autoclave purged with nitrogen gas, 500 ml of pure n-hexane was charged and 0.5 mmole of $Al(iso-C_4H_9)_3$ was added. Then, 25 mg of the solid catalyst was added. The atmosphere was purged with hydrogen gas and then, the mixture was heated to 90° C. A constant pressure polymerization was conducted under a hydrogen partial pressure of 5 $Kg/cm^2$ and an ethylene partial pressure of 5 $Kg/cm^2$, to obtain 232 g of powdery polyethylene having a bulk density of 0.31 g/cc and an average molecular weight of 46,000. The K value per amount of catalyst was 1,850 (g-polymer/g-catalyst $\times$ P $\times$ hr.). $K_{Ti}$ value per amount of Ti was 37,000 (g-polymer/g-Ti $\times$ P $\times$ hr.), wherein P designates ethylene partial pressure ($Kg/cm^2$). The distribution of molecular weight of the polymer was quite narrow and $M_W/M_N$ was 2.9.

EXAMPLE 2

The preparation of the solid catalyst was repeated in accordance with the process of Example 1, except using 2.5 g of $TiCl_3 \cdot 2$ THF prepared in Reference 2 and 7.3 g of magnesium chloride complex prepared in Reference 1 instead of $TiCl_3 \cdot 3$ THF. A solid catalyst containing 4.3 wt. % of Ti was obtained. The polymerization was repeated in accordance with the process of Example 1, except using this catalyst, to obtain 190 g of powdery polymer having a bulk density of 0.3 g/cc and an average molecular weight of 48,000. The K value was 1,520; the $K_{Ti}$ value was 39,000; and $M_W/M_N$ was 3.1. The elemental analysis of the resulting solid catalyst was as follows: Measured (wt.%) Mg: 10.9; Ti: 3.9; Cl: 40.8; and C: 29.5. This corresponds to $[Mg_{0.85} \cdot Ti_{0.15}]Cl_{2.10}(THF)_{1.15}$.

Comparative Example 1

The polymerization was repeated in accordance with the process of Example 1 except using only $TiCl_3 \cdot 3$ THF prepared in Reference 1. As a result, only 5.8 g of the polymer having an average molecular weight of 76,000 was obtained and the K value was 46.

EXAMPLE 3

The polymerization was repeated in accordance with the process of Example 1 except varying the hydrogen pressure to three levels indicated in the following table:

| Example | Ethylene pressure ($Kg/cm^2$) | Hydrogen pressure ($Kg/cm^2$) | Average molecular weight |
|---|---|---|---|
| 1 | 5 | 5 | 46,000 |
| 3-1 | 5 | 5.5 | 79,000 |
| 3-2 | 5 | 6.0 | 44,000 |
| 3-3 | 5 | 7.5 | 31,000 |

EXAMPLE 4

The polymerization was repeated in accordance with the process of Example 1 except changing the amount and type of the organo-aluminum compound used as a co-catalyst as indicated in the following table wherein are also shown the results:

| Example | Organo-aluminum Type | Amount (mmole) | Al/Ti molar ratio | K value |
|---|---|---|---|---|
| 1 | $Al(iso-C_4H_9)_3$ | 0.5 | 17.7 | 1,850 |
| 4-1 | " | 0.05 | 1.8 | 35 |
| 4-2 | " | 0.2 | 7.1 | 1,420 |
| 4-3 | " | 0.3 | 10.6 | 1,930 |
| 4-4 | " | 3.0 | 106 | 1,910 |
| 4-5 | $Al(C_2H_5)_3$ | 0.3 | 10.6 | 1,700 |
| 4-6 | $Al(n-C_8H_{17})_3$ | 0.3 | 10.6 | 2,300 |

EXAMPLE 5

The polymerization was repeated in accordance with the process of Example 1, except for feeding propylene and ethylene at a molar ratio of propylene to ethylene of 0.036, to effect a copolymerization. As a result, 128 g of a copolymer having a number of pendant methyl groups equal to 4.7 per 1000 carbon atoms, and having $M_W/M_N$ of 2.8 was obtained. The number of pendant methyl groups were determined by the infrared spectrum of the polymer.

EXAMPLE 6

The polymerization was repeated in accordance with the process of Example 1, except using the following solution instead of the solution of $TiCl_3 \cdot 3$ THF and $MgCl_2 \cdot 1.5$ THF in THF. $TiCl_3$ (20 mmole) was extracted with 130 ml of THF and the commercial anhydrous $MgCl_2$ (20 m mole) was extracted by 130 ml of THF. Both of the extract solutions were mixed and condensed to about half volume. The results were as follows:

| | |
|---|---|
| Ti in the solid catalyst | 9.2 wt. % |
| Average molecular weight of polyethylene | 49,000 |
| Bulk density of polyethylene powder | 0.28 g/cc |
| K value | 1,670 |
| $K_{Ti}$ value | 18,200 |
| $M_W/M_N$ | 3.1 |

The elemental analysis of the resulting solid catalyst was as follows: Measured (wt. %) Ti: 9.2; Mg: 5.6; Cl: 36; and C: 33. Thus, it corresponds to $[Mg_{0.55} \cdot Ti_{0.45}]Cl_{2.4}(THF)_{1.6}$.

EXAMPLE 7

In a 100 ml four-necked flask equipped with a stirrer, 7.0 mmole (2.26 g) of $TiCl_4 \cdot 2$ THF (prepared in Reference 3) was charged and dried. Then, 45 ml of oxygen-free THF (oxygen gas removed from THF) was fed into an argon gas atmosphere. The mixture was stirred at room temperature to obtain a clear yellow solution. Also, in a 200 ml four-necked flask equipped with a stirrer, which was dipped into a bath at 25° C, 8.4 mmole (1.84 g) of $MgCl_2 \cdot 1.5$ THF (prepared in Reference 1) was charged in an argon gas atmosphere, and 20 ml of said THF was added. The mixture was stirred at room temperature to obtain a colorless transparent solution. The former solution of $TiCl_4 \cdot 2$ THF in THF was added dropwise to the latter solution while stirring to form a pale yellow precipitate. The mixture was stirred for 1 hour. The precipitate was filtered, and was washed with pure n-hexane. It was dried at room temperature under reduced pressure to produce a powdery catalyst. The elemental analysis of the resulting catalyst was as follows:

| Elemental analysis $[Mg_{0.63} \cdot Ti_{0.37}]Cl_{2.74} \cdot (THF)_{2.45}$ | | | | |
|---|---|---|---|---|
| | Ti | Mg | Cl | C | H |
| Measured (wt. %) | 5.83 | 4.96 | 31.6 | 36.9 | 7.2 |
| Calculated (wt. %) | 5.77 | 4.99 | 31.7 | 38.3 | 6.44 |

In a 1 liter autoclave purged with nitrogen gas, 25 mg of said powdery catalyst, 0.45 mmole of $Al(iso\text{-}C_4H_9)_3$ and 500 ml of pure n-hexane were charged. The mixture was heated to 90° C. The polymerization of ethylene was conducted under an ethylene pressure of 5 $Kg/cm^2$ and a hydrogen pressure of 4 $Kg/cm^2$ for 1 hour, to obtain 119.5 g of powdery polyethylene. The catalytic activity and the properties of the resulting polymer were as follows:

| K value | 960 (g-polymer/g-catalyst $\times Kg/cm^2 \times$ ethylene pressure $\times$ hour) |
|---|---|
| $K_{Ti}$ value | 16,400 (g-polymer/g-Ti $\times Kg/cm^2 \times$ ethylene pressure $\times$ hour) |
| Bulk density | = 0.35 g/cc |
| M I (melt index) | = 4.3 |
| $M_w/M_N$ | = 2.9 |

EXAMPLE 8

The preparation of the solid catalyst was repeated in accordance with the process of Example 7, except using twice the amount of $MgCl_2 \cdot 1.5$ THF (16.8 mmole) and twice the amount of THF (40 ml) and adding dropwise the same amount of the solution of $TiCl_4 \cdot 2$ THF in THF. A yellow solid catalyst having the following formula (wt.%) was obtained.

| Elemental analysis $[Mg_{0.86} \cdot Ti_{0.14}]Cl_{2.23}(THF)_{1.6}$ | | | | |
|---|---|---|---|---|
| | Ti | Mg | Cl | C | H |
| Measured (wt. %) | 3.40 | 10.65 | 40.2 | 38.3 | 7.3 |
| Calculated (wt. %) | 3.41 | 10.64 | 40.28 | 39.10 | 6.56 |

The polymerization was repeated in accordance with the process of Example 7, except using this catalyst, to obtain 80 g of powdery polyethylene. The results were as follows:

| K value | 640 |
|---|---|
| $K_{Ti}$ value | 18,800 |
| Bulk density | 0.33 g/cc |
| M I (melt index) | 4.8 |
| $M_w/M_N$ | 2.8 |

EXAMPLE 9

The polymerization was repeated in accordance with the process of Example 7, except changing the amount of $Al(iso\text{-}C_4H_9)_3$ as indicated in the following table. The results were as follows:

| Example | $Al(iso\text{-}C_4H_9)_3$ (mmole) | Al/Ti (mole/mole) | Yield of polyethylene (g) | K value |
|---|---|---|---|---|
| 9-1 | 0.03 | 1 | 0 | 0 |
| 9-2 | 0.15 | 5 | 1.2 | 10 |
| 9-3 | 0.30 | 10 | 116.4 | 930 |
| 9-4 | 0.45 | 15 | 119.5 | 960 |
| 9-5 | 0.90 | 30 | 120.0 | 960 |

EXAMPLE 10

The polymerization was repeated in accordance with the process of Example 7, except changing the type of the organo-aluminum compound as indicated in the following table. The results are as follows:

| Example | Type of organo-aluminum | Amount (mmole) | Yield of polyethylene (g) | K value |
|---|---|---|---|---|
| 10-1 | $Al(C_2H_5)_3$ | 0.45 | 103.3 | 830 |
| 10-2 | $Al(iso\text{-}C_4H_9)_3$ | " | 119.5 | 960 |
| 10-3 | $Al(n\text{-}C_8H_{17})_3$ | " | 125.3 | 1,000 |
| 10-4 | $Al(C_2H_5)_2Cl$ | " | 41.2 | 300 |

EXAMPLE 11

The polymerization was repeated in accordance with the process of Example 7, except for feeding propylene at the partial pressure of 0.4 $Kg/cm^2$ in the polymerization zone, to effect a copolymerization. As a result, 128.3 g of a copolymer having a number of pendant methyl groups of 4.3 per 1000 carbon atoms was obtained. The number of pendant methyl groups were determined by the infrared spectrum.

Comparative Example 2

The polymerization was repeated in accordance with the process of Example 7, except using 72 mg of $TiCl_4 \cdot 2$ THF and 1.0 mmole of $Al(iso\text{-}C_4H_9)_3$, and feeding ethylene and hydrogen under an ethylene partial pressure of 10 $Kg/cm^2$ and a hydrogen partial pressure of 5 $Kg/cm^2$. After 5 minutes from the initiation of the polymerization, the stirring torque increased and the control of the inner temperature became difficult. After 17 minutes, the inner temperature increased to 94° C. Accordingly, the polymerization was stopped by adding 10 ml of methanol. The resultant polymer was in two forms: a laminated film adhering to the wall of the reactor and a strip adhering around the stirrer. The total amount of polymer was 18 g.

EXAMPLE 12

In a 1 liter four-necked flask equipped with a stirrer, 200 ml of pure THF, 5.26 g of $VCl_4 \cdot 2$ THF prepared in Reference 4, and 3.21 g of $MgCl_2 \cdot 1.5$ THF prepared in Reference 1 were charged in an argon gas atmosphere. The mixture was stirred at 60° C for 15 minutes to dissolve it, and the solution was cooled to room temperature. 800 ml of dry and oxygen-free dehydrated and deoxidized n-hexane was added dropwise to the resulting solution. The precipitate was separated by a decantation and was washed with pure n-hexane and dried at room temperature. The elemental analysis of the resulting solid catalyst was as follows:

|  | Mg | V | Cl | C | H |
|---|---|---|---|---|---|
| Measured (wt. %) | 5.6 | 9.6 | 31.5 | 35.8 | 6.1 |

This corresponds to $[Mg_{0.55} V_{0.45}]Cl_{2.1} \cdot (THF)_{1.8}$. In a 1 liter autoclave purged with nitrogen gas, 500 ml of pure n-hexane was charged and 0.4 mmole of $Al(iso-C_4H_9)_3$ was added. Then, 42 mg of the solid catalyst was added. The atmosphere was purged with hydrogen gas, and then, the mixture was heated to 90° C. Hydrogen gas was fed to produce a hydrogen partial pressure of 0.8 Kg/cm² and then, ethylene was fed to give a total pressure of 10 Kg/cm². A constant pressure polymerization was conducted for 1 hour. As a result, 140 g of polyethylene having a bulk density of 0.30 g/cc and an average molecular weight of 53,000 was obtained. During the polymerization, the ratio of the hydrogen partial pressure to the ethylene partial pressure was kept at a constant value of .104. When the catalyst was used, control of the polyethylene molecular weight by varying the amount of hydrogen gas was remarkably high.

K value per catalyst was 432

(g-polyethylene/g-catalyst × P × hr.)
(P : ethylene partial pressure)

$K_v$ value per V was 4,500

(K/ content of V in the catalyst).

As can be seen, the catalyst had a high catalytic activity for the polymerization of ethylene.

EXAMPLES 13 - 16

In a 1 liter four-necked flask equipped with a stirrer, 50 ml of pure THF along with 2.8 g of $VCl_3 \cdot 3$ THF prepared in Reference 5 and 1.45 g of $MgCl_2 \cdot 1.5$ THF prepared in Reference 1 were charged in an argon gas atmosphere. The mixture was stirred at 30° - 35° C for about 30 minutes to dissolve all components and was cooled to room temperature. 220 ml of dry and oxygen-free dehydrated and deoxidized n-hexane was added dropwise to the resulting solution. The precipitate was separated by a decantation and was washed with pure n-hexane. It was dried at room temperature. The elemental analysis of the resulting solid catalyst was as follows:

|  | Mg | V | Cl | C | H |
|---|---|---|---|---|---|
| Measured (wt. %) | 3.4 | 10.1 | 28.4 | 37.7 | 6.7 |

This corresponds to $[Mg_{0.41} V_{0.59}]Cl_{2.4} \cdot (THF)_{2.4}$. In a 1 liter autoclave purged with nitrogen gas, 500 ml of pure n-hexane was charged and 0.20 mmole of $Al(iso-C_4H_9)_3$ was added. Then, 20 mg of the solid catalyst was added. The atmosphere was purged with hydrogen gas, and then, the mixture was heated to 90° C. Hydrogen gas was fed to produce a hydrogen partial pressure of 0.5 – 3 Kg/cm² in the autoclave and then, ethylene was fed while stirring to give a total pressure of 10 Kg/cm². The polymerization was initiated. Consumption of ethylene accrued, but is was continuously fed to keep the total pressure at 10 Kg/cm², thereby conducting a constant pressure polymerization, for 1 hour. The results are shown in Table 1.

TABLE 1

|  |  | Example 13 | Example 14 | Example 15 | Example 16 |
|---|---|---|---|---|---|
| Hydrogen gas partial pressure (kg/cm²) |  | 0.5 | 0.8 | 1.0 | 1.5 |
| Resulting polyethylene (powder) | Amount (g) | 141 | 131 | 128 | 120 |
|  | Average molecular weight | 116,000 | 55,000 | 42,000 | 29,000 |
| K value |  | 880 | 850 | 850 | 860 |
| $K_v$ value |  | 8,720 | 8,420 | 8,420 | 8,520 |

Comparative Example 3

The polymerization was repeated in accordance with the process of Example 12, except for using 81 mg of $VCl \cdot 3$ THF prepared in Reference 5 and 1.3 mmole of $Al(iso-C_4H_9)_3$, and feeding ethylene and hydrogen under an ethylene partial pressure of 20 Kg/cm² and a hydrogen partial pressure of 2 Kg/cm². As a result, 68 g of polyethylene having a bulk density of 0.35 g/cc and a melt index of 1.5 was obtained.

$$K_v \text{ value} = \frac{68}{81 \times 10^{-3} \times 20 \times 1.0 \times 0.139} = 302.$$

Having now fully described the invention, it will be apparent to one of ordinary skill in the art that many changes and modifications can be made thereto without departing from the spirit or scope of the invention as set forth herein.

What is claimed as new and intended to be covered by Letters Patent is:

1. A solid catalytic complex for the polymerization of an olefin of the formula:

$$[Mg_n M_{1-n}]X_m \cdot xY$$

wherein M represents a transition metal selected from the group consisting of titanium and vanadium; X represents a halogen atom; Y represents an aliphatic ether or a cyclic ether; $n$ is 0.01 – 0.99, $2<m<4$, and $1<x<3$, prepared by co-precipitating the product from an ether solution of (1) an ether complex of a halide of a transition metal selected from the group consisting of titanium and vanadium, and (2) an ether complex of a magnesium halide.

2. The solid catalytic complex of claim 1, wherein M is trivalent or tetravalent titanium or vanadium.

3. The solid catalytic complex of claim 1, of the formula:

$$[Mg_nTi_{1-n}]X_m \cdot xY$$

wherein X represents a halogen atom; Y represents an aliphatic ether or a cyclic ether; $n$ is $0.01 - 0.99$; $2<m<4$; and $1<x<3$.

4. The solid catalytic complex of claim 3, wherein the titanium is tetravalent and $2<m<4$.

5. The solid catalytic complex of claim 3, wherein titanium is trivalent and $2<m<3$.

6. The solid catalytic complex of claim 1 of the formula:

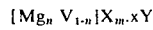
$$[Mg_n V_{1-n}]X_m \cdot xY$$

wherein X represents a halogen atom; Y represents an aliphatic ether or a cyclic ether; $n$ is $0.01 - 0.99$; $2<m<4$; and $1<x<3$.

7. The solid catalytic complex of claim 6, wherein V is tetravalent and $2<m<4$.

8. The solid catalytic complex of claim 6, wherein V is tetravalent; and $2<m<3$.

9. A process for preparing the solid catalytic complex of claim 1 which comprises:
co-precipitating the product from an ether solution of
1. an ether complex of a halide of a transition metal selected from the group consisting of Ti and V, and
2. an ether complex of magnesium halide.

10. The process for preparing the solid catalytic complex of claim 9, wherein titanium is used as the transition metal.

11. The process for preparing the solid catalytic complex of claim 9, wherein vanadium is used as the transition metal.

12. The solid catalytic complex of claim 1, wherein Y represents an aliphatic ether or a cyclic ether selected from the group consisting of diethyl ether, diisopropyl ether, dibutyl ether, diamyl ether, ethyl-n-butyl ether, tetrahydrofuran and dioxane.

13. The solid catalytic complex of claim 12, wherein Y represents an aliphatic ether or a cyclic ether selected from the group consisting of tetrahydrofuran, dioxane and diisopropyl ether.

14. The solid catalyst complex of claim 1, wherein Y represents tetrahydrofuran.

15. A process for the polymerization of an olefin, which comprises:
polymerizing an olefin in the presence of a catalyst composition of an organo-aluminum compound and the catalyst complex of claim 1, wherein said organo-aluminum compound is combined with said catalyst complex in an amount of 2-50 moles per mole of catalyst complex.

16. The process for the polymerization of an olefin of claim 15, wherein the olefin is ethylene or a combination of ethylene and another $\alpha$-olefin.

17. The process for the polymerization of an olefin of claim 15, wherein the organo-aluminum compound is selected from the group consisting of an alkyl haloaluminum compound having the formula:

$$AlR_nX_{3-n}$$

wherein R represents a $C_{1-14}$ saturated hydrocarbon residue, X represents a halogen atom and $n$ is 2 or 1.5; a compound having the formula:

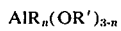
$$AlR_n(OR')_{3-n}$$

wherein R and $n$ are defined above, and R' represents a $C_{1-4}$ saturated hydrocarbon residue which can be the same as R; and a trialkyl aluminum compound having the formula:

$$AlRR'R''$$

wherein R, R' and R'' are the same or different and each represents a $C_{1-14}$ saturated hydrocarbon residue.

18. A catalytic mixture for the polymerization of an olefin, which comprises:
the solid catalytic complex of claim 1, in combination with an organo-aluminum compound, wherein said organo-aluminum compound is combined with said catalytic complex in an amount of 2–50 moles per mole of catalyst complex.

19. The catalytic mixture of claim 18, wherein the organo-aluminum compound is selected from the group consisting of an alkyl haloaluminum compound having the formula:

$$AlR_nX_{3-n}$$

wherein R represents a $C_{1-14}$ saturated hydrocarbon residue, X represents a halogen atom and $n$ is 2 or 1.5; a compound having the formula:

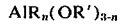
$$AlR_n(OR')_{3-n}$$

wherein R and $n$ are defined above, and
R' represents a $C_{1-4}$ saturated hydrocarbon residue which can be the same as R and
a trialkyl aluminum compound having the formula:

$$AlRR'R''$$

wherein R, R' and R'' are the same or different and each represents a $C_{1-14}$ saturated hydrocarbon residue.

* * * * *